United States Patent [19]
Herbert

[11] 3,847,453
[45] Nov. 12, 1974

[54] SHAFT ARRANGEMENTS

[76] Inventor: Colin Wray Herbert, 44 High St., Stokesley, England

[22] Filed: Jan. 12, 1973

[21] Appl. No.: 323,096

[30] Foreign Application Priority Data
Jan. 13, 1972  Great Britain.................... 1674/72

[52] U.S. Cl................ 308/36.1, 277/34.3, 277/59, 308/36.3, 308/26
[51] Int. Cl. ........................................ F16c 33/74
[58] Field of Search............... 308/36.1, 36.3, 26; 277/59, 34.3

[56] References Cited
UNITED STATES PATENTS

| | | | |
|---|---|---|---|
| 3,491,825 | 1/1970 | Peterson et al.................. | 277/34.3 |
| 3,514,115 | 5/1970 | Gallo................................. | 277/34.3 |
| 3,578,341 | 5/1971 | LeFebrve........................... | 277/59 |
| 3,625,523 | 12/1971 | Gardner et al..................... | 277/59 |
| 3,717,352 | 2/1973 | Jansing et al...................... | 277/59 |
| 3,726,531 | 4/1973 | Pagan et al........................ | 277/59 |

Primary Examiner—Charles J. Myhre
Assistant Examiner—R. H. Lazarus
Attorney, Agent, or Firm—Pierce, Scheffler & Parker

[57] ABSTRACT

This invention is a damper of vibrations in a liquid chamber — for example, a lubricant chamber — surrounding a shaft. A gas space is included in the liquid chamber for accommodating fluctuations in liquid pressure, for example due to shaft vibrations — which might otherwise cause a seal for the liquid around the shaft to fail.

11 Claims, 5 Drawing Figures

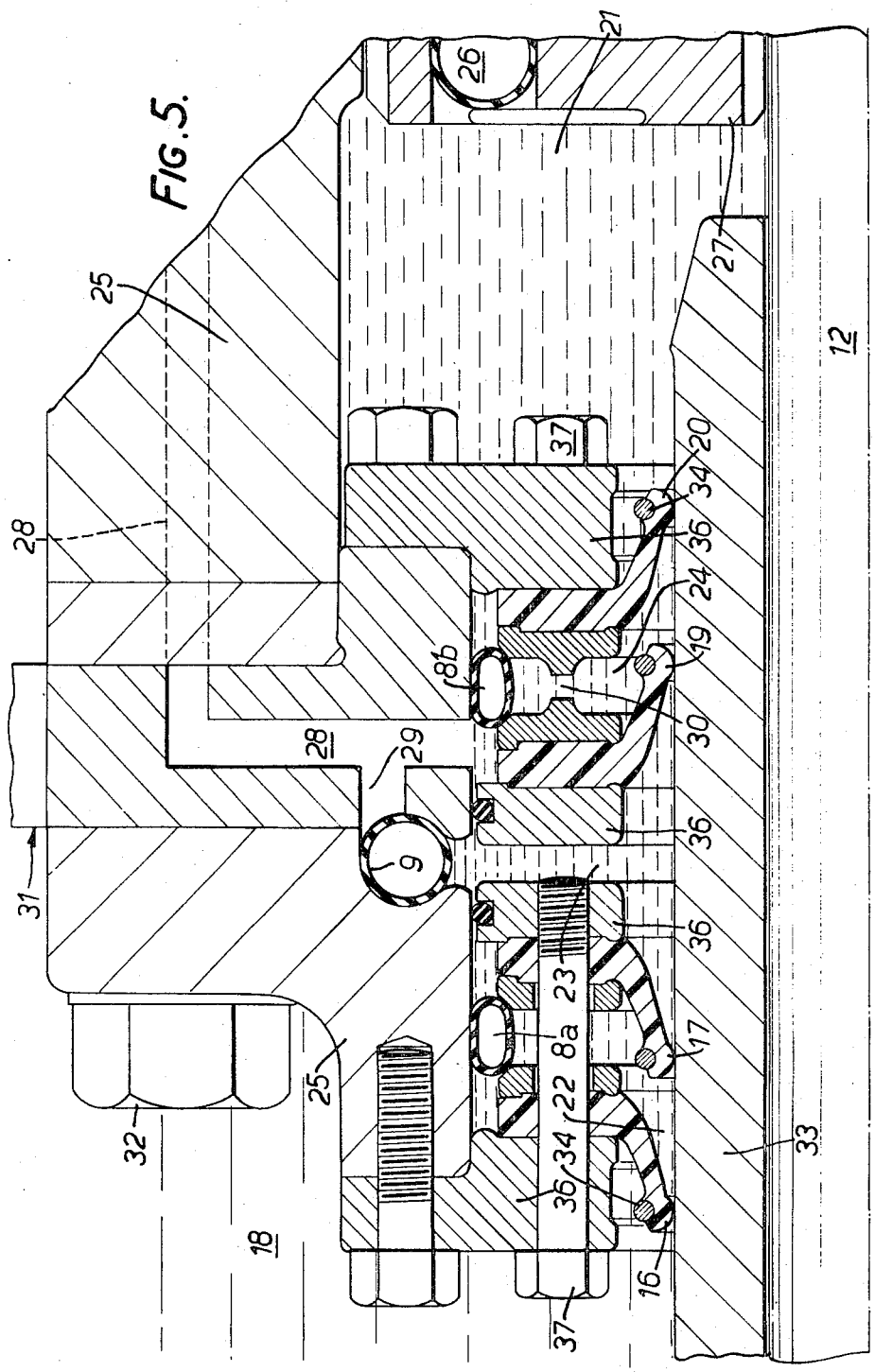

SHAFT ARRANGEMENTS

This invention relates to shaft arrangements in which a shaft is surrounded by a liquid chamber which may be a chamber containing lubricating oil for a bearing for the shaft.

One application of the invention is to a shaft for driving the propeller of a ship which has a number of seals along the shaft for controlling the flow of lubricating oil from the shaft bearing both to the interior of the ship and outwards to the sea and for controlling the entry of sea-water.

In such an application shaft vibrations can be set up, possibly due to irregular loading, which can cause pressure variations in the liquid in the chamber surrounding the shaft, which pressure variations can cause seals to leak. It is an object of the present invention to reduce the effect of, or prevent, pressure variations in the liquid in such a chamber surrounding the shaft.

According to the present invention, the liquid chamber contains a gas space whereby variations in liquid pressure can be accommodated by change in gas volume.

Thus the gas space may be defined by an elastic-walled envelope which may be elongated extending circumferentially around the shaft in one or a number of sections, and as liquid pressure increases locally at one side of the shaft, the envelope can contract whereas a corresponding pressure reduction at the other side of the shaft in the liquid chamber can be accommodated by the expansion of the envelope.

The invention is particularly applicable to a shaft arrangement having a liquid seal fixed in relation to rotation of the shaft for controlling the flow of liquid along the shaft to or from the chamber. Such a seal may consist of a flexible disc pressed by its own resilience, or otherwise, against the shaft. Again it may consist of rotating and stationary face seals normally pressed into contact with each other in planes generally perpendicular to the shaft axis.

Again the seal may consist of an arrangement of ring-like segments pressed against the surface of the shaft.

Where there are a number of seals along the shaft there may be a passage for feeding liquid to a liquid chamber defined between two of the seals.

The general result of using the gas space according to the invention will be to damp pressure variations in the liquid chamber.

The invention may be carried into practice in various ways and certain embodiments will be described by way of example only, with reference to the accompanying drawings in which.

Figures 1, 3:
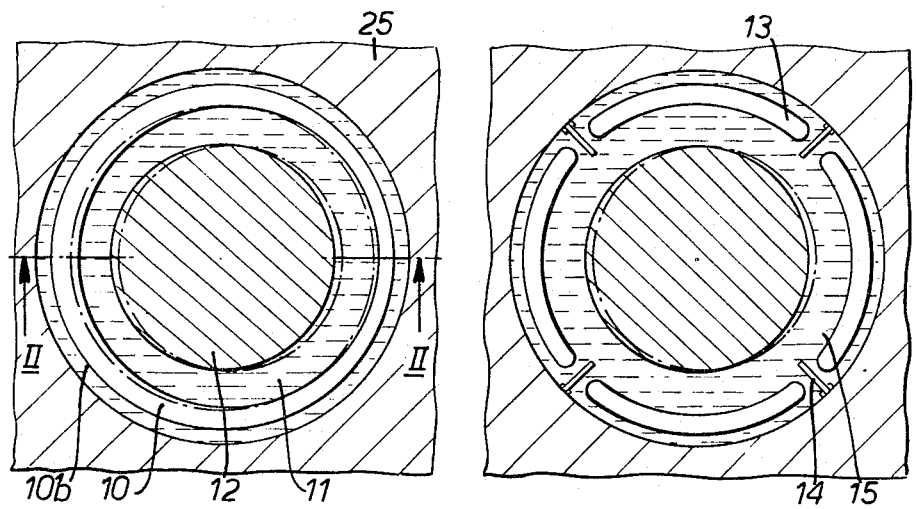
FIG. 1 is a cross-section through a part of a shaft seal assembly embodying the invention.
Figures 2, 4:
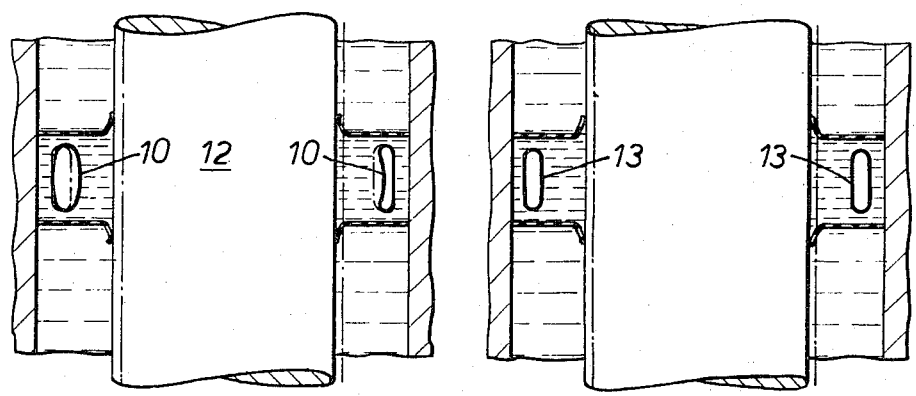
FIG. 2 is a section on the line II—II in FIG. 1.

FIGS. 3 and 4 are sections corresponding to FIGS. 1 and 2 respectively of a second embodiment of the invention, and FIG. 5 is a longitudinal section on the axis of a ship's propeller shaft provided with a seal assembly according to FIGS. 1 and 2.

FIG. 5 shows a ship's propeller shaft 12 running in a bearing 27 and extending through hull 31. A seal controlling fluid flow along the shaft includes a pair of housings 25 united on opposite sides of the hull 31 by bolts 32. The inner housing also houses the bearing 27.

The shaft 12 carries an external bush 33 which co-operates with flexible sealing rings 16, 17, 19, 20. The rings have conical flanges urged towards the bush 33 by their inherent resilience and by spring gripping rings 34. The flanges on the rings 16 and 17 are directed aft to restrict the flow of sea-water 18 inwards along the shaft, while the flanges on the rings 19 and 20 are directed inwardly to restrict the flow of bearing lubricating oil 21 outwards The rings are held in the housings 25 by annular portions clamped by clamp plates 36 and bolts 37. The rings of each pair 16, 17, or 19, 20 are urged apart against inner and outer plates 36 by fluid pressure between then as described below.

The pressure of the lubricating oil is maintained above the sea-water pressure, and this oil is fed through internal passages 28 and 29 to the annular spaces 24 and 23 respectively between the rings 19 and 20 and the rings 17 and 19.

Oil from the space 23 can flow into the space 22 between the rings 16 and 17 due to the one-way action of the conical flange of the ring 17. Due to the pressure drop across the flanges, the pressure at 22 will be intermediate between the pressure at 23 and in the sea at 18.

Each space 22, 23 and 24, contains an air filled rubber tube 8a, 9 or 8b.

The tubes, when their walls are unstressed, contain air at a pressure not higher than the lowest oil pressure that will be experienced in the spaces 22, 23, 24. They may be complete annuli as shown in FIGS. 1 and 2 or in arcuate sectors 13 as indicated in FIGS. 3 and 4, and then they will be located by stops 14.

In use, the air in the tubes is compressed to provide a balance with the surrounding oil in the spaces 22, 23, 24.

If the shaft vibrates or whirls causing local lateral displacement, the oil can be displaced and the tubes can expand or contract locally to accommodate oil pressure fluctuations which are damped and considerably reduced.

A tube 26 similar to the tube 9 is shown fitted in the restricted annular space between the seal assembly and the end of the bearing 27. Also if the space surrounding the inboard seal lip 20 were similarly restricted, another tube could be fitted in that locality, or indeed in any equivalent restricted space to improve the damping effect.

The cross-section area of each tube is determined with regard to the length of shaft enclosed between the adjacent seal lips and to the cross-section area and shape of the oil filled space, with the object of equalising and maintaining in phase any residual pressure fluctuations in the other oil filled spaces.

In an alternative arrangement, the tube 9 in the space 23 is omitted and the space 23 is filled with air which is maintained at a lower pressure than the sea pressure by means of a pressure balancing device. Air is supplied to the space by the passages 29 and a similar passage is provided in the space 23 on the opposite side of the shaft and is connected to a pressurised fluid drain. With this alternative arrangement there is a separate oil filling passage direct to the space 22.

Resonance that may occur between the pressure fluctuations excited by shaft movement and those in the resilient sac can be reduced by separating a space such as the space 24 into two concentric regions connected by restrictive ducts 30 which will provide viscous damping of movements of the incompressible fluid.

If there is a danger that shaft vibrations will set up resonances with the gas, the resonance frequency of the gas-filled tube can be modified by including some liquid.

Instead of a gas-filled rubber tube 9, it is possible to define the gas space by the cells in a closed-cell porous sponge or like compressible body in the annular liquid space.

Again it is possible to supply gas bubbles around the space instead of the tube or sponge, to provide the damping effect.

What I claim as my invention and desire to secure by Letters Patent is:

1. In combination, a shaft, means defining a liquid chamber surrounding the shaft, a seal controlling the flow of liquid along the shaft to or from chamber, and an elastic-walled envelope in the chamber defining independently of the seal a gas space for accommodating variations in liquid pressure by change in gas volume.

2. A combination as claimed in claim 1 in which the envelope extends circumferentially around the shaft and is not in intimate contact with the shaft.

3. A combination as claimed in claim 2 in which the envelope is in a number of separate circumferentially extending sections end to end.

4. A combination as claimed in claim 1 including in the liquid chamber a throat restricting the free flow of liquid from a region adjacent the envelope to a region adjacent the shaft.

5. A combination as claimed in claim 1 including a pair of seals one on each side of the chamber along the shaft.

6. A combination as claimed in claim 5 in which each seal comprises a pair of sealing devices spaced apart along the shaft with a chamber between them and including a gas space in the said chamber.

7. A combination as claimed in claim 1 including means for feeding liquid to the chamber.

8. A combination as claimed in claim 1 in which the shaft is the propeller shaft in a ship and including a liquid seal on the shaft for preventing sea-water from entering the liquid chamber along the shaft.

9. A combination as claimed in claim 8 including a bearing for the shaft and in which a liquid seal restricts the flow of lubricant from the bearing to the liquid chamber along the shaft.

10. In combination, a shaft; means defining a liquid chamber surrounding the shaft; a seal controlling the flow of liquid along the shaft to or from the chamber; and a closed cell sponge in the chamber independently of the seal, the cells of which sponge define a gas space for accommodating variations in liquid pressure by change in gas volume.

11. In combination, a shaft; means defining a liquid chamber surrounding the shaft; a seal controlling the flow of liquid along the shaft to or from the chamber; and means independent of the seal for supplying gas bubbles to the liquid chamber for accommodating variations in liquid pressure by change in gas volume.

* * * * *

UNITED STATES PATENT OFFICE
CERTIFICATE OF CORRECTION

Patent No. 3,847,453   Dated Nov. 12, 1974

Inventor(s) _____

It is certified that error appears in the above-identified patent and that said Letters Patent are hereby corrected as shown below:

Claim 1, line 3 before "chamber" insert:

- the -

Signed and sealed this 4th day of March 1975.

(SEAL)
Attest:

RUTH C. MASON
Attesting Officer

C. MARSHALL DANN
Commissioner of Patents
and Trademarks